(12) United States Patent
Betran Palomas et al.

(10) Patent No.: US 9,499,241 B2
(45) Date of Patent: Nov. 22, 2016

(54) FLOATING OFFSHORE STRUCTURES

(71) Applicant: ALSTOM RENEWABLE TECHNOLOGIES, Grenoble (FR)

(72) Inventors: Jaume Betran Palomas, Sant Cugal del Vallès (ES); Roger Bergua, Barcelona (ES)

(73) Assignee: ALSTOM RENEWABLE TECHNOLOGIES, Grenoble (FR)

( * ) Notice: Subject to any disclaimer, the term of this patent is extended or adjusted under 35 U.S.C. 154(b) by 0 days.

(21) Appl. No.: 14/314,998

(22) Filed: Jun. 25, 2014

(65) Prior Publication Data
US 2015/0000583 A1    Jan. 1, 2015

(30) Foreign Application Priority Data

Jun. 27, 2013  (EP) .................................... 13382251

(51) Int. Cl.
| | |
|---|---|
| B63B 35/44 | (2006.01) |
| B63B 1/10 | (2006.01) |
| B63B 1/04 | (2006.01) |
| B63B 21/50 | (2006.01) |

(52) U.S. Cl.
CPC .............. *B63B 35/44* (2013.01); *B63B 1/048* (2013.01); *B63B 1/107* (2013.01); *B63B 21/50* (2013.01); *B63B 21/502* (2013.01); *B63B 2035/442* (2013.01); *B63B 2035/446* (2013.01); *Y02E 10/727* (2013.01)

(58) Field of Classification Search
CPC ... B63B 35/00; B63B 35/44; B63B 35/4406; B63B 1/00; B63B 1/107; B63B 1/048; B63B 21/50; B63B 21/502; B63B 2035/4433; B63B 2035/446; B63B 38/00; B63B 39/00
USPC ..................... 114/258–267; 290/44
See application file for complete search history.

(56) References Cited

U.S. PATENT DOCUMENTS

| | | | | |
|---|---|---|---|---|
| 3,982,401 A | * | 9/1976 | Loggins ................ | B63B 21/502 166/352 |
| 6,021,728 A | * | 2/2000 | Delrieu ............... | B63B 35/4413 114/125 |
| 7,075,189 B2 | * | 7/2006 | Heronemus ............... | F03D 9/00 290/44 |
| 8,022,566 B2 | * | 9/2011 | Loh et al. ............. | F03D 7/0224 290/44 |
| 8,169,099 B2 | * | 5/2012 | Roznitsky ............... | F03D 1/001 290/44 |

(Continued)

FOREIGN PATENT DOCUMENTS

| | | |
|---|---|---|
| EP | 2 311 725 | 4/2011 |
| GB | 2 114 079 A | 8/1983 |

(Continued)

OTHER PUBLICATIONS

Extended European Search Report for EP 13382251.0, mailed Nov. 22, 2013, 7 pgs.

*Primary Examiner* — Daniel V Venne
(74) *Attorney, Agent, or Firm* — Squire Patton Boggs (US) LLP (57) ABSTRACT

A floating offshore structure comprises a buoyancy structure arranged such that in use it remains below the sea level and a tower, wherein the buoyancy structure is attached to a tower by a connecting structure, the connecting structure comprising one or more openings arranged such that in use they remain below the sea level, and the one or more openings being dimensioned such that sea water can flow into and out of the connecting structure with variations of the sea level.

6 Claims, 6 Drawing Sheets

(56) References Cited

U.S. PATENT DOCUMENTS

| | | | |
|---|---|---|---|
| 8,197,208 B2 * | 6/2012 | Sharples | F03D 1/0608 |
| | | | 415/7 |
| 8,471,399 B2 * | 6/2013 | Lefranc | 290/44 |
| 8,729,723 B2 * | 5/2014 | Boureau | F03D 1/001 |
| | | | 290/55 |
| 2004/0028479 A1 | 2/2004 | Horton | |
| 2011/0037264 A1 * | 2/2011 | Roddier | B63B 35/44 |
| | | | 290/44 |
| 2011/0107953 A1 | 5/2011 | Jahnig | |
| 2011/0241347 A1 * | 10/2011 | Boureau | F03D 1/001 |
| | | | 290/53 |
| 2012/0103244 A1 * | 5/2012 | Gong | B63B 21/50 |
| | | | 114/265 |

FOREIGN PATENT DOCUMENTS

| | | |
|---|---|---|
| WO | WO 98/29298 A1 | 7/1998 |
| WO | WO 01/73292 A1 | 10/2001 |
| WO | WO 2009/063112 A1 | 5/2009 |

* cited by examiner

FLOATING OFFSHORE STRUCTURES

This application claims the benefit of European Patent Application 13382251.0 filed on Jun. 27, 2013, the entire contents of which are hereby incorporated by reference for all purposes.

The present disclosure relates to floating offshore structures.

BACKGROUND ART

Floating offshore structures such as e.g. oil platforms, offshore wind turbines, and offshore meteorological towers are known.

Several configurations have been proposed for the floating or buoyancy of structures: many of these employ floater elements in the form of substantially hollow floater tanks that in use are arranged substantially below the sea level and provide a buoyancy force to support the structure, e.g. a wind turbine. Ballast and/or mooring lines anchored to the seabed are provided for achieving stability.

In some of these floating structures, the buoyancy structure is designed to provide an excess buoyancy force and is maintained floating under the sea level by taut mooring lines tensioned by the excess buoyancy force.

For example, concepts have been developed such as the "Taught Leg Buoy" (TLB) floating wind turbine, with a slender cylindrical buoy and two or more sets of tensioned mooring lines, inclined relative to the seabed and connected to gravity anchors and to the buoy; or such as the "Tension Leg Platform" (TLP) floating wind turbine, in which the tensioned mooring lines are substantially vertical and are connected between gravity anchors on the seabed and arms or braces extending radially outwards with respect to the vertical axis of the wind turbine. The arms of the TLP may be part of the buoyancy structure, for example in the form of hollow spokes that extend radially outwards from a hollow central hub, or may be arranged above the sea level, in which case the buoy may be a slender cylindrical tank like in the TLB concept.

In order for these structures to be stable, the mooring lines must always be under tension; otherwise the offshore structure could become unstable and could fall over. Since the loads on the offshore structures, and particularly on a floating wind turbine may vary considerably both in magnitude and direction, a high amount of excess buoyancy and high tension in the cables may be required.

The buoyancy structures of floating offshore structures, particularly of floating wind turbines, may be subject to several loads, such as for example the weight of the wind turbine itself, impacts, forces exerted by waves, currents and tides, and also aerodynamic forces associated with the wind, rotor rotation, etc. Furthermore, like any body submerged in water, buoyancy structures are subject to hydrostatic pressure on the outer walls that are in contact with the sea water, and consequent buckling.

Buoyancy structures are also subjected to great loads especially derived from buoyancy variations because buoyancy normally varies considerably with sea level changes, i.e. tide changes or waves. At low tide, the sea level becomes lower and the tension in the mooring lines can be relatively low (minimum required tension). In these cases care should be taken not to reach zero. When the sea level rises at e.g. high tide, the tension in the mooring lines can be significantly higher, i.e. in this example, the tension in the mooring lines at high tide would be equal to the minimum required tension (the tension at low tide) plus the entire buoyancy variation. If the buoyancy variation is reduced, the tension variation in the mooring lines is also reduced, but at the same time stability is maintained.

There thus exists a need for floating offshore structures that substantially reduce buoyancy variations, but at the same time maintain their stability.

SUMMARY

In accordance with a first aspect, a floating offshore structure is provided. The floating structure comprises a buoyancy structure arranged such that in use it remains below the sea level and a tower. The buoyancy structure is attached to a tower by a connecting structure that comprises one or more openings arranged such that in use they remain below the sea level and the one or more openings are dimensioned such that sea water can flow into and out of the connecting structure depending on the sea level.

Having at least one opening dimensioned such that sea water can flow into and out of the connecting structure ensures that inside the connecting structure the water level will correspond to the sea level. Thus the connecting structure does not add buoyancy to the system. As a result, no extra buoyancy would be added by the connecting structure when the sea level becomes higher and no reduction of buoyancy would affect the offshore structure when the sea level becomes lower. Buoyancy variations due to waves or tide changes can thus be avoided or at least substantially reduced.

This is a simple and cost-effective solution. It can be easily implemented in current TLPs offshore structures e.g. by drilling at least one hole of the appropriate dimensions in the connecting structure, i.e. a hole that allows sea water to flow into and out of the connecting structure.

In some embodiments, the connecting structure may further comprise one or more breathing orifices arranged such that in use they normally remain above the sea level. This enhances the natural flow of water into and out of the connecting structure as it reduces the risk of vacuum generation within the connecting structure e.g. when water flows into the connecting structure, thus ensuring no air providing buoyancy remains inside the connecting structure when the sea level increases.

In some embodiments, at least one portion of the connecting structure that in use is at or below sea level may be an open structure. In others, the whole connecting structure may be an open structure. In further embodiments, the open structure may be a lattice structure. An open structure or a lattice structure ensures no air inside the connecting structure up to the height of the sea level, i.e. no air providing buoyancy.

In some embodiments, the offshore structure may further comprise a plurality of radially outwardly extending braces and a mooring line attached to each of the braces at one end and to the seabed at the other end. In some of these cases, the braces may be arranged such that in use they remain above the sea level. In these cases, the buoyancy structure is less affected by all the loads arising from the rest of the offshore floating structure above the braces such as, e.g. in the case of an offshore wind turbine, the wind or the rotor rotation. These loads are directly transmitted from the tower to the braces and from here to the mooring lines anchored to the seabed. Since the connecting structure is subjected to less loads than in other configurations, the at least one opening is more readily acceptable in view of the loads the connecting structure may have to suffer.

Furthermore, with this system, variation in the tension of the mooring lines can also be reduced in quite a simple manner. A reduction of the tension of the mooring lines results in less bending loads on the braces, so that these may be made lighter as well. The lifetime of the mooring lines and the whole structure may be extended. Alternatively, if the maximum tension in the mooring lines is maintained the same, the offshore structure may be more stable than prior art configurations.

In some embodiments, the floating offshore structure may further comprise a wind turbine. In other examples, the floating offshore structure may be a floating meteorological tower, an offshore oil platform, a floating bridge, a floating breakwater structure, a floating LPG terminal or other.

Another aspect provides a method of reducing buoyancy variations in an offshore wind turbine comprising a buoyancy structure arranged such that in use it remains below the sea level and a tower, wherein the buoyancy structure is attached to the tower by a connecting structure. The method comprises providing at least one opening in the connecting structure arranged such that in use it remains below the sea level and dimensioned such that sea water can flow into and out of the connecting structure depending on the sea level.

Additional objects, advantages and features of embodiments of the invention will become apparent to those skilled in the art upon examination of the description, or may be learned by practice of the invention.

BRIEF DESCRIPTION OF THE DRAWINGS

Particular embodiments of the present invention will be described in the following by way of non-limiting examples, with reference to the appended drawings, in which.

DETAILED DESCRIPTION

Figure 1:
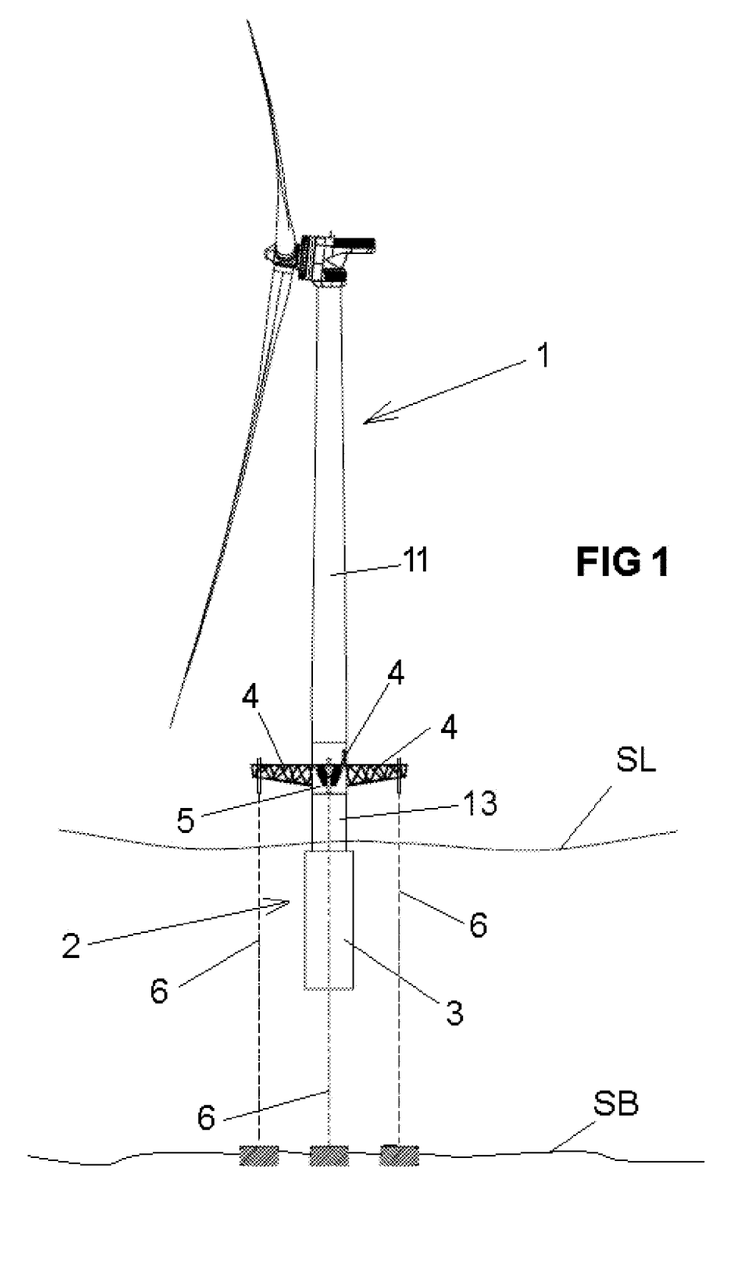
FIG. 1 schematically illustrates a side view of an example of an offshore floating wind turbine.

FIG. 1 shows an example of an offshore wind turbine of the TLP (Tension Leg Platform) type having arms 4 that in use remain above the sea level.

All throughout the present description and claims, the expression "sea level" should be understood to cover all possible heights of the surface of the sea including the highest and lowest tides and including variations due to waves.

The wind turbine 1 may comprise a buoyancy structure 2, with at least one floater tank 3. The buoyancy structure 2 may be designed such as to remain submerged in a position above the sea bed SB and below the sea level SL to provide an upward thrust for supporting the weight of the wind turbine 1 and other loads.

In order to stabilize a floating wind turbine with such a buoyancy structure, i.e. in order to restrain its six degrees of freedom (surge, sway, heave, pitch, roll and yaw) within acceptable limits, mooring lines 6 may be put under tension by the excess buoyancy provided by the floater tank. In alternative embodiments, more than one floater tank may be provided.

All throughout the present description and claims, the expression "mooring lines" should be understood to cover e.g. cables, chains, ropes, wires or similar used for mooring a floating structure.

Figure 2:
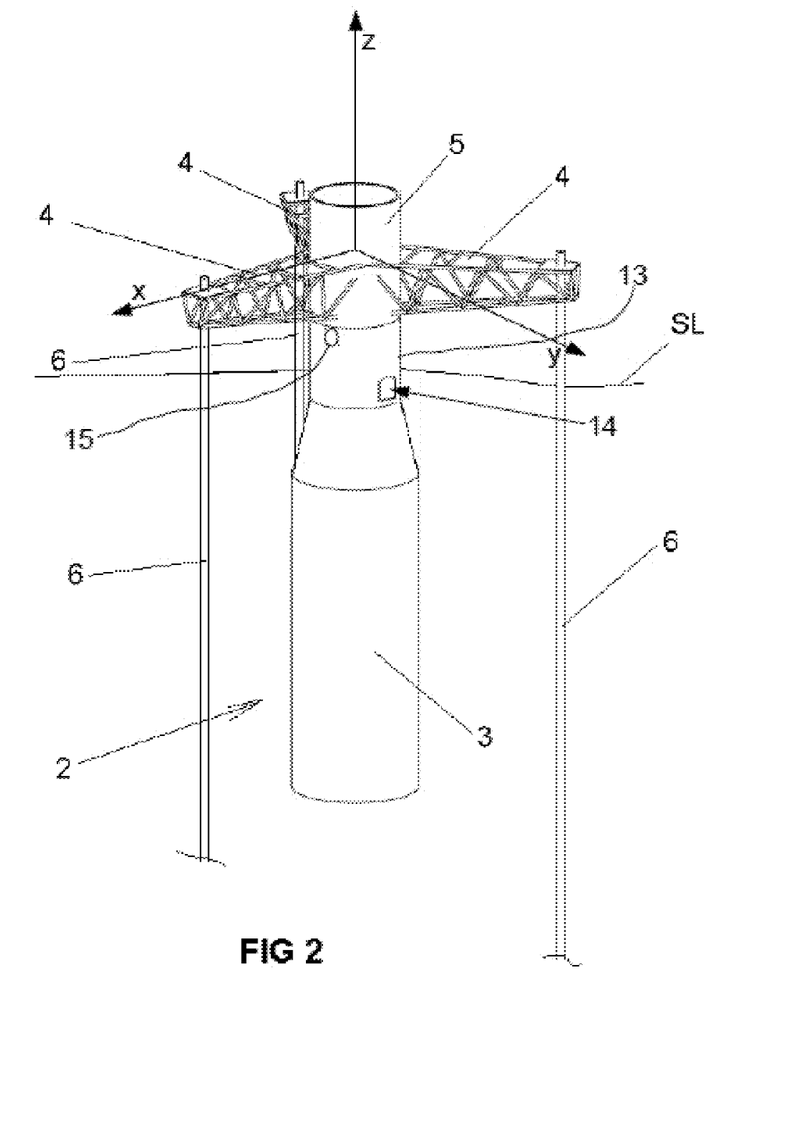
FIG. 2 shows schematically in perspective view an enlarged detail of the wind turbine of FIG. 1.

The floater tank 3 may have a substantially cylindrical shape like the one shown in FIGS. 1 and 2, and may have a diameter that is smaller than its length. For example, the floater tank 3 may be around 20 m in length and may have a diameter of between 6 and 12 m. This kind of buoyancy structure is sometimes referred to as a "spar-buoy".

The floater tank 3 may have a central geometric axis (here the vertical axis of the cylinder), and the floater tank may be arranged such that this axis is substantially or generally aligned with the axis of the wind turbine tower 11, i.e. the cylindrical floater tank 3 may be arranged substantially under the wind turbine, as shown. Other configurations are also possible as long as an upward thrust for supporting the weight of the wind turbine is provided.

The wind turbine 1 may be provided with three braces 4. The braces 4 may extend radially outwards from a wind turbine tower supporting structure 5, at a height above the sea level SL. A mooring line 6 may be attached to each of the braces 4 at one end and to the seabed SB at the other end. It is also possible to use more than one mooring line for each brace.

A connecting structure 13 may be arranged between the floater tank 3, i.e. the buoyancy structure, and the supporting structure 5. The supporting structure 5 may be arranged between the wind turbine tower 11 and the connecting structure 13. In some configurations, such a supporting structure may be known as "transition piece".

As shown in FIGS. 1 and 2, the three braces 4 may be in the form of a lattice structure. In alternative examples, the braces may be in the form of a closed structure. Furthermore, more than three braces may also be provided. Three braces (each separated by a 120° angle) with mooring lines are able to provide dynamic stability regardless of wind direction, direction of waves, tidal flow etc. In other configurations, the plurality of braces may define a platform or an integrated deck.

Further mooring lines (not shown) may be arranged between a lower end of the floater tank and the sea bed.

One aspect of a wind turbine shown in FIGS. 1 and 2 is that the design of the buoyancy structure does not need to take into account all the loads arising in a wind turbine: wind loads, for example, are transmitted from the wind turbine tower to the braces 4 and from here to the mooring lines 6 anchored to the seabed SB.

As shown in FIG. 2, the connecting structure 13 provided between the floater tank 3 and the supporting structure 5 may comprise an opening 14 arranged at a lower portion of the connecting structure 13 such that in use it remains below the sea level SL. Such an opening may be dimensioned such that sea water can flow into and out of the connecting structure 13. In other alternatives, more openings may be provided as long as there is at least one opening arranged to be below sea level for all possible sea levels.

In further embodiments, at least one orifice 15 may further be provided in an upper portion of the connecting structure 13 arranged such that in use it remains above the sea level.

Figure 3A:
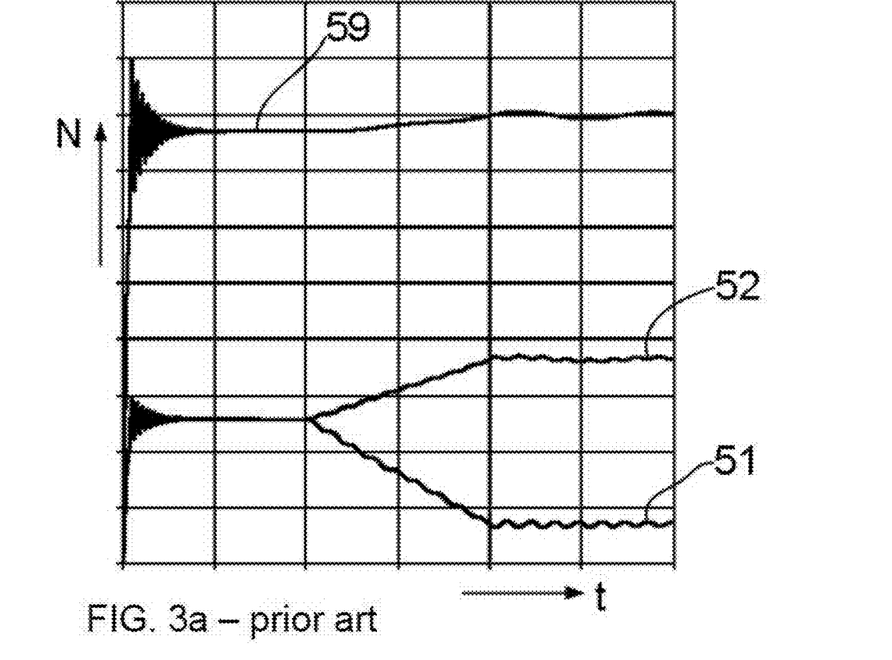
FIGS. 3a-3b schematically illustrate how varying loads may result in varying tension in mooring lines of an offshore wind turbine of the prior art.
Figure 3B:
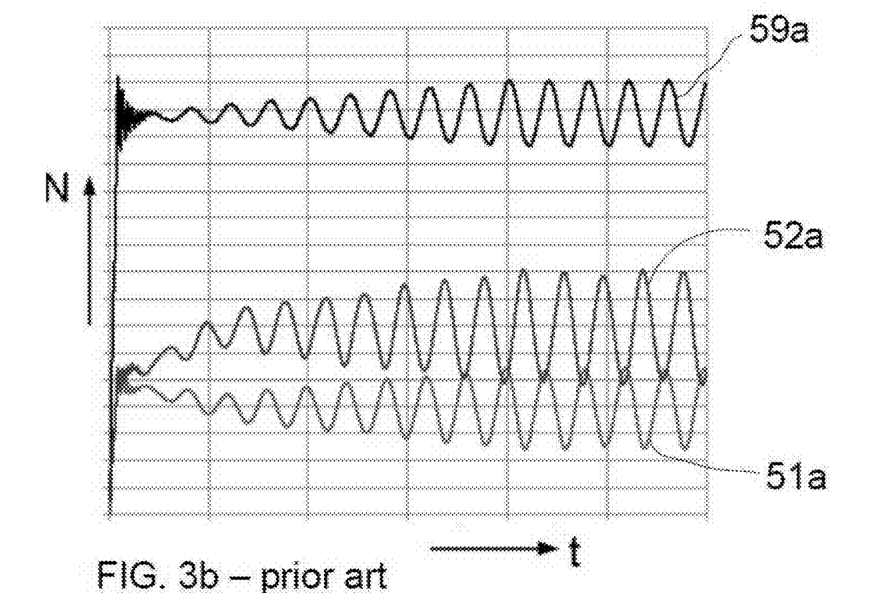

In FIG. 2 a reference coordinate system is shown. The x-axis may correspond to the prevailing wind direction at any given moment. This direction may thus correspond substantially to the orientation of the wind turbine rotor. The z-axis may correspond to the longitudinal axis of the wind turbine tower. The y-axis may be defined as being perpendicular to both the x-axis and the z-axis. It is to be noted that even though in FIG. 2, the x-axis is substantially parallel to one of the braces 4, this is not necessarily the case, as the x-axis may depend on the wind direction, not on the structure itself. FIGS. 3a and 3b illustrate the effect of some loads on the tension in the mooring lines in prior art offshore wind turbines.

FIG. 3a illustrates how the tension in the three mooring lines may vary in response to the loads generated by the wind in the x-axis according to a coordinate system similar to that shown in FIG. 2, i.e. in a direction substantially parallel to one of the braces. Reference sign 51 indicates the tension in the mooring line at or near the end of the brace along the x-axis. Reference sign 52 indicates the tension in the other mooring lines. Reference sign 59 indicates the excess buoyancy of the system as a whole, which naturally corresponds to the sum of the tensions in the mooring lines.

FIG. 3b illustrates how the tension in the three mooring lines shown in FIG. 3a may vary in response to wave loads. Considering a wave as a standard substantially sinusoidal wave form, the load variations may be explained by the troughs and crests of the sinusoidal wave form. During crests, the wave may be at a peak, and the offshore structure may be more submerged than the submersion corresponding to mean sea level. During crests, additional excess buoyancy is thus generated, automatically increasing the tension in the mooring lines. During troughs on the other hand, there is less excess buoyancy, automatically decreasing the tension in the mooring lines. Reference sign 51a indicates the tension in the mooring line in response to wave loads at or near the end of the brace along the x-axis. Reference sign 52a indicates the tension in the other mooring lines in response to wave loads. And reference sign 59a indicates the excess buoyancy of the system as a whole, which naturally corresponds to the sum of the tensions in the mooring lines. A potentially dangerous situation on the stability of the offshore structure may thus arise from wave loads.

It should be noted that the direction of wave loads may or may not correspond to the wind direction at any given moment. Above-mentioned effect arises regardless of whether the direction of the wave loads corresponds to the wind direction or not.

Figure 3C:
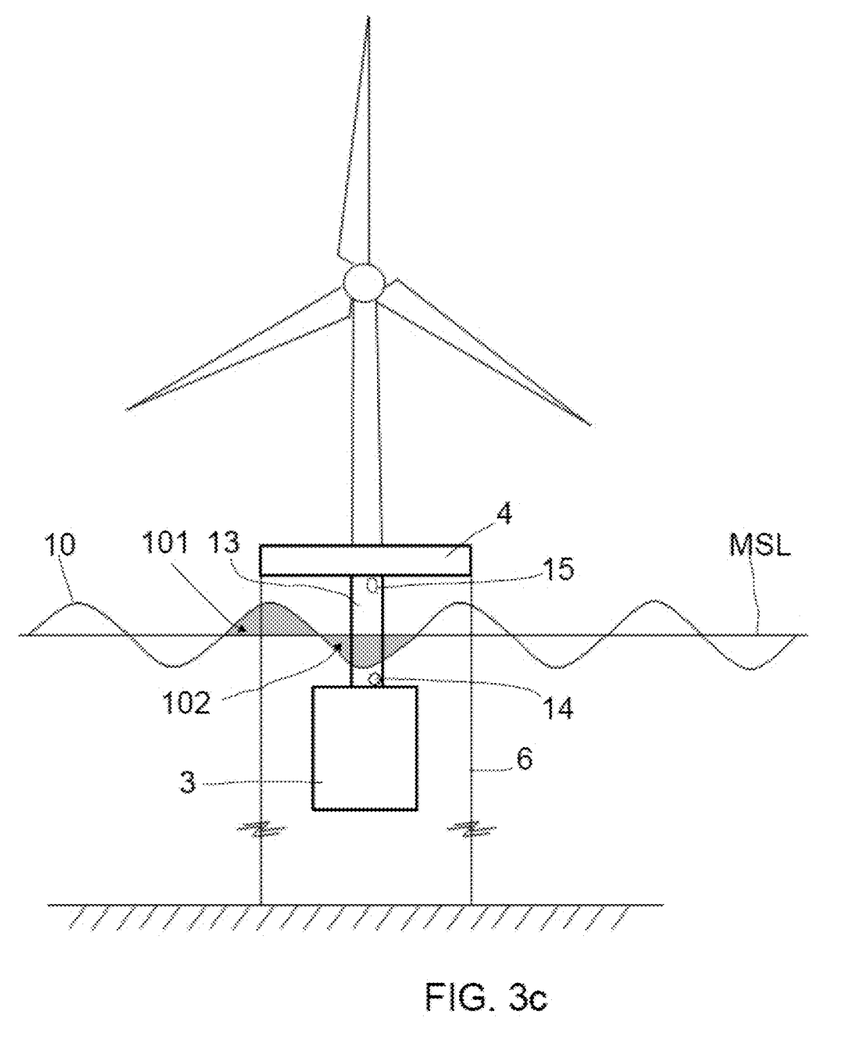
FIGS. 3c-3d illustrate-examples of offshore wind turbines according to the present disclosure.
Figure 3D:
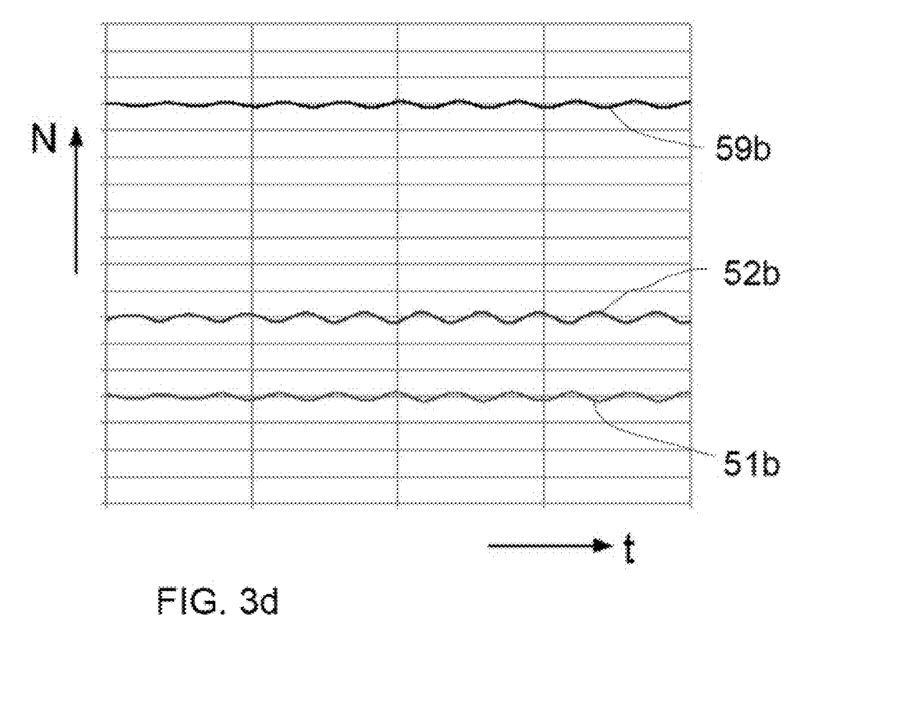

FIGS. 3c and 3d illustrate two examples-of floating wind turbines according to the present disclosure. Also in this case, a TLP configuration is shown. In FIG. 3c an opening 14 may be provided in a lower portion of the connecting structure 13 arranged to remain below sea level regardless of tides and wave changes. Further in this example, an orifice 15 may further be provided in an upper portion of the connecting structure 13 arranged to remain above sea level regardless of the tides and wave changes. The connecting structure 13 in FIG. 2 and FIG. 3c is capable of holding sea water. In FIG. 3d a substantial portion of the connecting structure 13 is a lattice structure 13'. FIGS. 3c and 3d show-a standard substantially sinusoidal wave form 10. The wave form 10 may include troughs 102 and crests 101. During crests 101, the wave may be at a peak, and the offshore structure may be more submerged than the submersion corresponding to Mean Sea Level MSL. In FIG. 3c, the presence of the opening 14 in a lower portion of the connecting structure 13 ensures that the sea water flows into the connecting structure 13 during crests. In FIG. 3d this is ensured by the fact that the connecting structure is an open structure in the form of a lattice structure. Excess buoyancy caused by the presence of submerged portions of the connecting structure is thus avoided or at least minimized and since there is substantially no variation in the buoyancy, the tension in the mooring lines is substantially maintained. On the contrary, during troughs 102, the opening of FIG. 3c or the lattice structure of FIG. 3d ensures that the sea water flows out of the connecting structure 13 thus avoiding or at least reducing buoyancy variations. The tension in the mooring lines is thus substantially maintained regardless wave loads thus extending their lifetime.

A similar explanation can be given with respect to the influence of tides. Some meters of difference in height of the sea level between low tide ("ebb") and high tide ("flood") may occur. The presence of the opening in a lower portion of the connecting structure or the fact that the connecting structure is an open structure ensures that sea water flows into the connecting structure at high tides and flows out of the connecting structure at low tides in a similar manner as explained in connection to wave loads. This avoids or at least minimizes buoyancy variations. Therefore variations in the tension of the mooring lines are also reduced.

Figure 3E:
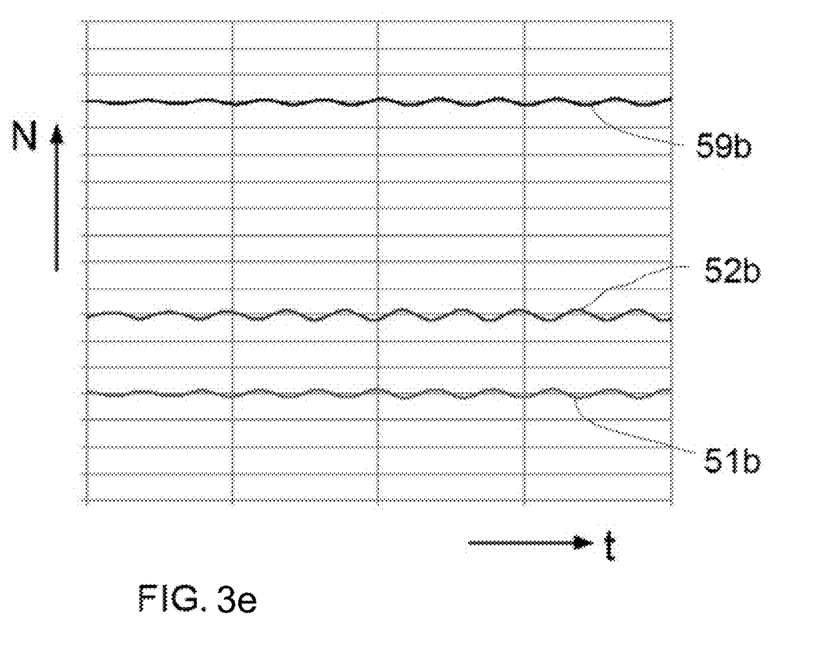
FIG. 3e schematically illustrates how varying loads may result in varying tension in mooring lines of any of the offshore wind turbines of FIG. 3c or 3d.

FIG. 3e illustrates how buoyancy variations of the system may be minimized using examples of the present invention. Reference 51b shows the tension in the mooring line at or near the end of the brace along the x-axis. Reference sign 52b indicates the tension in the other mooring lines and reference sign 59b indicates the excess buoyancy of the system as a whole, which corresponds to the sum of the tensions in the mooring lines. As it can be observed, the maximum tension over any of the mooring lines is very similar to their nominal value. And the excess buoyancy 59b is almost constant over time.

Examples of the present invention may be applied to any offshore structure having a buoyancy structure arranged below the sea level and a tower, the buoyancy structure being connected to the tower by a connecting structure.

Although only a number of particular embodiments and examples of the invention have been disclosed herein, it will be understood by those skilled in the art that other alternative embodiments and/or uses of the invention and obvious modifications and equivalents thereof are possible. Furthermore, the present invention covers all possible combinations of the particular embodiments described. Thus, the scope of the present invention should not be limited by particular embodiments, but should be determined only by a fair reading of the claims that follow.

The invention claimed is:
1. A floating offshore structure, comprising:
a buoyancy structure arranged such that the buoyancy structure remains below sea level;
a wind turbine comprising a tower;
wherein the buoyancy structure is attached to the tower by a connecting structure capable of holding sea water, the connecting structure comprising one or more openings arranged such that the one or more openings remain below the sea level, wherein the one or more openings allow sea water to flow in and out of the connecting structure so that water level inside the connecting structure corresponds to the sea level;
wherein sea water flows into and out of the connecting structure with variations of the sea level; and
wherein the connecting structure further comprises one or more orifices arranged such that the one or more orifices remain above the sea level, the orifices being configured to enhance the flow of sea water in and out of the connecting structure and permit the flow of air out of the connecting structure, so that no air providing buoyancy remains inside the connecting structure when the sea level rises.

2. The floating offshore structure of claim 1, further comprising a plurality of radially outwardly extending braces and a mooring line attached to each of the braces at one end and to a seabed at another end.

3. The floating offshore structure of claim 2, wherein the braces are arranged such that the braces remain above the sea level.

4. The floating offshore structure of claim 2, wherein the braces are arranged such that the braces remain below the sea level and form part of the buoyancy structure.

5. The floating offshore structure of claim 2, wherein the braces extend radially outwards from a wind turbine transition piece that is arranged between the connecting structure and the tower.

6. The floating offshore structure of claim 2, wherein the braces are at least three in number.

\* \* \* \* \*